US005137778A

United States Patent [19]

Nakatsugawa et al.

[11] Patent Number: 5,137,778

[45] Date of Patent: Aug. 11, 1992

[54] INK-JET RECORDING MEDIUM, AND INK-JET RECORDING METHOD EMPLOYING THE SAME

[75] Inventors: Tomomi Nakatsugawa, Kawasaki; Mamoru Sakaki, Sagamihara; Yutaka Kurabayashi; Hiroshi Sato, both of Yokohama, all of Japan

[73] Assignee: Canon Kabushiki Kaisha, Tokyo, Japan

[21] Appl. No.: 711,134

[22] Filed: Jun. 6, 1991

[30] Foreign Application Priority Data

Jun. 9, 1990 [JP] Japan .................................. 2-150571
Jun. 9, 1990 [JP] Japan .................................. 2-150572

[51] Int. Cl.[5] .................................................. B32B 9/00

[52] U.S. Cl. ..................................... 428/330; 346/1.1; 428/195; 428/341

[58] Field of Search ............... 428/195, 212, 331, 914, 428/488.4, 328, 330, 341, 411.1; 346/1.1

[56] References Cited

U.S. PATENT DOCUMENTS 4,460,637 3/1992 Miyamoto et al. ................. 428/212
4,758,461 7/1988 Akiya et al. ......................... 428/212
4,832,984 5/1989 Hasegawa et al. .................. 427/161
5,041,328 8/1991 Akiya et al. ......................... 428/212
5,081,470 1/1992 Kurabayashi et al. ............... 346/1.1

FOREIGN PATENT DOCUMENTS 0199874 11/1986 European Pat. Off. .
0405417 1/1991 European Pat. Off. .
0411638 2/1991 European Pat. Off. .
54-59936 5/1979 Japan .
56-148585 11/1981 Japan .
59-185690 10/1984 Japan .
60-54915 3/1985 Japan .
61-57380 3/1986 Japan .
61-63526 4/1986 Japan .
61-135785 6/1986 Japan .
63-89418 4/1988 Japan .
2210375 6/1989 United Kingdom .

*Primary Examiner*—Bruce H. Hess
*Attorney, Agent, or Firm*—Fitzpatrick, Cella, Harper & Scinto

[57] ABSTRACT

A recording medium comprises basic magnesium carbonate and a magnesium salt of silicic acid or of phosphorus oxy-acid. Ink-jet recording is conducted using the recording medium to obtain high image density without any problem such as indoor discoloration, white haze, fattening of letters, etc.

13 Claims, No Drawings

INK-JET RECORDING MEDIUM, AND INK-JET RECORDING METHOD EMPLOYING THE SAME

BACKGROUND OF THE INVENTION

1. Field of the Invention

The present invention relates to a recording medium suitable for ink-jet recording, and a method of ink-jet recording employing the recording medium.

2. Related Background Art

Non-treated ordinary paper and coated paper having an ink-receiving layer have been conventionally used as recording mediums for ink-jet recording.

The non-treated ordinary paper, when used for recording with aqueous ink, involves disadvantage that formed images undergo running or feathering, giving neither high density of images nor high resolution of the images.

To offset the disadvantage, various ink-jet recording mediums have been proposed which comprise supporting paper and an ink-receiving layer formed thereon for absorbing aqueous ink. For example, Japanese Patent Application Laid-Open No. 56-148585 describes coated paper comprising ink-absorbing base paper and an ink-receiving layer formed thereon with inorganic porous pigment: Japanese Patent Application Laid-Open No. 61-135785 describes an ink-jet recording medium containing a hydrotalcite compound; and Japanese Patent Application Laid-Open No. 61-57380 describes an ink-jet recording medium comprising an ink-receiving layer containing porous inorganic pigment and a slightly soluble magnesium compound.

The recording mediums of the prior art as described above have advantages that neither feathering of ink nor fattening of printed letters occurs and high resolution of images can be achieved. These recording mediums, however, do not readily give high image density. In the case where silica or alumina having a large specific surface area is employed as described, for example, in Japanese Patent Application Laid-Open No. 59-185690 for the purpose of achieving higher image density, another disadvantage is involved that the recording dye discolors with lapse of time and the recorded image deteriorates under normal environmental conditions, for example, only by posting on an indoor wall.

The above described indoor discoloration can be retarded by forming the ink-receiving layer by use of calcium carbonate or kaolin having a small specific surface area, or a hydrotalcite compound as disclosed in Japanese Patent Application Laid-Open No. 61-135785, and the like. However, the density of the resulting image is low, and feathering or fattening of letters occurs, thus no clear image being given.

Moreover, when the aforementioned pigment or pigments having an average particle diameter of 7 μm or larger are used solely or combinedly, white haze of the printed letters is liable to be caused. This white haze is a phenomenon characteristic to lightly coated paper having a thin ink-receiving layer, and is considered to be caused by the fact that the thin coating layer does not completely cover the fiber exposed on the surface of the base paper, and the dye absorption ability of the exposed fiber portion is low, thus the image density at the exposed fiber portion being decreased. Such problems can naturally be solved if the ink-receiving layer is formed thick to cover the entire fiber of paper. However, such recording mediums having thick ink-receiving layer are not paper-like and are undesirable also in view of cost and weight.

The fattening of the printed letters can be avoided by adding a cationic polymer having high dye-absorbing power into the ink-receiving layer, but preservability of the recorded images is deteriorated thereby.

As described above, the conventional coated paper having a thin ink-receiving layer cannot achieve high density of images without feathering of images nor fattening of letters, and cannot avoid white haze and indoor discoloration, not easily satisfying the general requirements for ink jet-recording mediums at the same time.

SUMMARY OF THE INVENTION

An object of the present invention is to provide an ink-jet recording medium which is free from the disadvantages of prior art discussed above, namely feathering, fattening of letters, white haze, indoor discoloration, and which enables formation of images of high density.

Another object of the present invention is to provide a ink-jet recording method employing the above recording medium.

According to an aspect of the present invention, there is provided an ink-jet recording medium comprising basic magnesium carbonate and a magnesium salt of silicic acid.

According to another aspect of the present invention, there is provided an ink-jet recording medium comprising a layer containing basic magnesium carbonate and a magnesium salt of silicic acid formed on a support.

According to still another aspect of the present invention, there is provided an ink-jet recording medium comprising basic magnesium carbonate and a magnesium salt of phosphorus oxy-acid.

According to a further aspect of the present invention, there is provided an ink-jet recording medium comprising a layer containing basic magnesium carbonate and a magnesium salt of phosphorus oxy-acid formed on a support.

According to a still further aspect of the present invention, there is provided an ink-jet recording method conducted by applying droplets of aqueous ink onto a recording medium, the recording medium comprising basic magnesium carbonate and a magnesium salt of silicic acid.

According to a still further aspect of the present invention, there is provided an ink-jet recording method conducted by applying droplets of aqueous ink onto a recording medium, the recording medium comprising a layer containing basic magnesium carbonate and a magnesium salt of silicic acid formed on a support.

According to a still further aspect of the present invention, there is provided an ink-jet recording method conducted by applying droplets of aqueous ink onto a recording medium the ink-jet recording medium comprising basic magnesium carbonate and a magnesium salt of phosphorus oxy-acid.

According to a still further aspect of the present invention, there is provided an ink-jet recording method conducted by applying droplets of aqueous ink onto a recording medium, the recording medium comprising a layer containing basic magnesium carbonate and a magnesium salt of phosphorus oxy-acid formed on a support.

DESCRIPTION OF THE PREFERRED EMBODIMENT

The magnesium salts of silicic acids employed in the present invention are known substances per se. In the present invention, any substance is useful which has a composition of combination of magnesium oxide with silicon dioxide and water in an arbitrary ratio, including, for example, magnesium orthosilicate ($Mg_2SiO_4$), magnesium metasilicate ($Mg_2SiO_3$), and further talc, magnesium tetrasilicate ($Mg_3Si_4O_{11}.H_2O$), magnesium trisilicate ($2MgO.3SiO_2.nH_2O$) and the like. The particle diameter of the silicic acid salt is preferably not larger than 7 μm in average diameter, more preferably not large than 12 μm in 90%-diameter, but is not limited thereto. A particle size larger than that specified above is not preferable in view of prevention of white haze of image and prevention of fattening of letters because of presence of non-covered fiber due to insufficiency of coverage of supporting paper.

The magnesium salts of phosphorus oxy-acid per se employed in the present invention are known compounds. A particularly preferable one is magnesium phosphate, including an anhydrous salt, tetrahydrate, octahydrate, docosa(22)hydrate, which are all useful in the present invention. The particle diameter of the salt is preferably not larger than 7 μm in average diameter, more preferably not large than 12 μm in 90%-diameter, but is not limited thereto. A particle size larger than that specified above is not preferable in view of prevention of white haze of image and prevention of fattening of letters because of presence of non-covered fiber due to insufficiency of coverage of supporting paper.

The basic magnesium carbonate which is combinedly used with the magnesium salt of silicic acid or the magnesium salt of phosphorus oxy-acid is not specially limited. Among them, spherical basic magnesium carbonate having shapes disclosed in Japanese Patent Application Laid-Open Nos. 60-54915, 61-63526, and 63-89418 is desirable, but the preparative method is not limited to those described therein.

The term "spherical" in the present invention is referred to about the shape of agglomeration of primary particles, and the particles are not necessarily in a precisely sphere form. The preferable spherical shape herein has the major axis "a" and the minor axis 37 b" in the ratio within the range of $0.7 \leqq b/a \leqq 1.0$.

In the production of the spherical basic magnesium carbonate, precisely spherical shape is not always achievable depending on the reaction conditions varied to adjust the particle diameter, the specific surface area, the oil absorption ability, and other pigment properties. In some cases, agglomeration is in a partially defective spherical shape or a petal-shape agglomeration. In the present invention, those in a defective spherical shape having the lacking portion of not more than ¼ of the total imaginary sphere is included in the spherical shape.

The average particle diameter of the basic magnesium carbonate is preferably in the range of from 0.5 to 20 μm, more preferably from 1 to 12 μm. The above range is preferable in the aspects of improvement in ink absorbing ability and prevention of powder-falling off and additionally, in the aspects of slurry application property and printing property.

An excessively large number of larger particles causes decrease of dispersibility to cause formation of big coagulum, giving adverse effect in coating suitability or printing suitability, and is undesirable.

A preferable support employed in the present invention is a base paper sheet having ink-absorbing property, but is not limited thereto. The support may be a polymer film such as a polyester film. In the preferred embodiment described below, base paper having ink absorption ability is used as the support.

The ink-receiving layer of the ink-jet recording medium of the present invention is constituted of the aforementioned magnesium salt of silicic acid or of phosphorus oxy-acid, basic magnesium carbonate, a binder, and other additives.

The ratio of the basic magnesium carbonate to the magnesium salt of silicic acid or of phosphorus oxy-acid is preferably in the range of from 1/5 to 9/1 by weight. The above range is preferable in all the aspects including indoor discoloration of formed image, higher image density and prevention of feathering, running and white haze.

In the present invention, a conventionally used inorganic or organic pigment may be used in addition to the above-specified pigments within the range that does not prevent the object of the present invention.

The binders useful in the present invention include known water-soluble polymers such as polyvinyl alcohol, starch, oxidized starch, cationic starch, casein, carboxymethylcellulose, gelatin, hydroxyethylcellulose, acrylic resins and the like; water-dispersion type polymers such as SBR latex, polyvinyl acetate emulsion, and the like: and mixtures of two or more thereof.

The preferable ratio of the use of the pigment to the binder is in the range of from 10/1 to ¼, more preferably from 6/1 to 1/1. The above range is preferable in the aspects of improvement in ink absorbing ability and prevention of powder falling-off.

Further in the present invention, the ink-receiving layer may contain an additive such as a dye-fixing agent (a water-proofing agent), a fluorescent whitener, a surface active agent, an anti-foaming agent, a pH adjusting agent, a mildew-proofing agent, a UV absorbing agent, a dispersing agent, a viscosity-reducing agent, and the like, if necessary. Such additives can be selected from known compounds in accordance with the object.

In producing the recording medium of the present invention, an aqueous coating liquid which contains pigments, a binder, and other additives as mentioned above is applied on a base material according to a known coating method such as a roll coater method, a blade coater method, an air-knife coater, method, a gate-roll coater method, a size press method and the like, and thereafter the coating is dried with a drier such as a hot-air drier, a hot drum, and the like, thus giving a recording medium of the present invention.

The recording medium thus produced may further be treated with a supercalender for smoothening or strengthening the ink-receiving layer surface.

The coating amount of the ink-receiving layer is preferably in the range of from 0.2 to 50 g/m$^2$, more preferably from 0.2 to 20 g/m$^2$. With a smaller amount of coating, a portion of the base material may be exposed at the surface. The above range is preferable in the aspects of improvement in color development of dyes and prevention of powder falling-off from the coat layer. The preferable coating amount is shown by coating thickness to be in the range of from 0.5 to 100 μm.

Preferable embodiment of the present invention is described above. Further, the recording medium of the present invention includes those having the above-mentioned pigments incorporated in the interior of the supporting paper in addition to those having ink-receiving layer formed on the surface of the support.

Known inks are useful for ink-jet recording on the recording medium without any problem.

Any usual recording agent may be used without special limitation, including water-soluble dyes such as direct dyes, acidic dyes, basic dyes, reactive dyes, and food dyes.

The water soluble dye is contained in conventional inks generally at a concentration of from about 0.1 to about 20% by weight. The concentration may be the same in the present invention.

The solvent for the aqueous ink of the present invention is water or a mixed solvent of water with a water-soluble organic solvent. Particularly preferable are mixed solvents of water with an organic solvent, containing a polyhydric alcohol giving ink-drying prevention effect as the water-soluble organic solvent.

The recording on the aforementioned recording medium is conducted by applying the above ink thereon, preferably by ink-jet recording method. The recording method may be any method in which ink is ejected effectively from a nozzle onto a shooting object of the recording medium.

In particular, an ink-jet recording method is effectively employed in which an ink, on receiving thermal energy, abruptly changes its volume by phase transition to be ejected from a nozzle by the action of the volume change as described in Japanese Patent Application Laid-Open No. 54-59936.

The present invention is described in more detail by reference to Examples and Comparative examples. In the description, the terms "parts" and "%" are based on weight unless otherwise mentioned.

EXAMPLES 1-5

The average particle diameters of the magnesium salts of silicic acid used in producing the recording mediums of the present invention are shown in Table 1 below. As the basic magnesium carbonate, spherical basic magnesium carbonate A and spherical basic magnesium carbonate B having the average particle diameters and the BET specific surface areas shown in Table 1 were prepared and used (prepared according to the method disclosed in Japanese Patent Application Laid-Open No. 60-54915 with modification of reaction conditions).

TABLE 1

| Sample | Maker | Average particle diameter (μm) | BET specific surface area ($m^2/g$) |
|---|---|---|---|
| Tomix AD600 (I) *1 | Tomita Seiyaku K. K. | 1.22 | — |
| Pulverized one (II) *2 | | 5.6 | — |
| KYOWAAD 600 (III) *1 | Kyowa Kagaku K. K. | 34.9 | — |
| Spherical basic magnesium carbonate A | Self-made | 10.2 | 30 |
| Spherical basic magnesium carbonate B | Self-made | 6.7 | 40 |

*1 Magnesium silicate
*2 Magnesium silicate (KYOWAAD 600), pulverized experimentally by means of a sand mill The recording mediums were prepared by the method below.

Firstly, 15 parts of spherical basic magnesium carbonate was mixed with 85 parts of water, and the mixture was stirred for 15 minutes at 10,000 rpm by means of a commercial homogenizer.

In the same manner, 10 parts of magnesium silicate was mixed and stirred with 90 parts of water.

The above two dispersions were mixed with a separately prepared aqueous binder solution (aqueous 10% polyvinyl alcohol solution) in a desired pigment/binder ratio (based on solid contents) and stirred for 5 minutes. Further, various necessary additives were added in a specified amount, and stirred for 5 minutes.

The coating liquid prepared as above was applied onto a base paper having a reduced sizing degree of 3 second as a basis weight of 65 $g/m^2$ in a coating solid amount of 5 $g/m^2$, The coated matter was dried at 110° C. for 5 minutes, and was subjected to a supercalender treatment to give a recording medium of the present invention.

For every recording medium, the used binder contained polyvinyl alcohols made by Kuraray Co., Ltd., PVA117 (saponification degree: 98.5 mol%, viscosity at concentration of 4% at 20° C.: 35 cps) and PVA217 (saponification degree: 89 mol%, viscosity at concentration of 4% at 20° C.: 30 cps) in a solid matter ratio of PVA117/PVA217=4/1.

As a dye fixing agent, PAS-A-12OS made by Nitto Boseki Co., Ltd. (a polyamine sulfonate salt, molecular weight: $10^5$) was added in an amount of 10% by weight based on the pigments. The ratio of the pigments to the binder was 2/1.

The constitutions of the pigments for the recording mediums of Examples 1-5 prepared above were summarized in Table 2.

TABLE 2

| Example No. | Spherical basic magnesium carbonate | | Magnesium silicate | |
|---|---|---|---|---|
| | Type | Parts | Type | Parts |
| 1 | A | 4 | I | 1 |
| 2 | A | 2 | I | 1 |
| 3 | B | 4 | I | 1 |
| 4 | B | 4 | II | 1 |
| 5 | B | 4 | III | 1 |

EXAMPLE 6

With the recording mediums of Examples 1-5, ink-jet recording was practiced by use of the ink having the composition below in an amount of ink of 8 $nl/mm^2$ for each single color.

| | | |
|---|---|---|
| Ink composition | | |
| Dye | | 5 parts |
| Diethylene glycol | | 20 parts |
| Water | | 80 parts |
| Dye | | |
| Y: | C.I. Direct Yellow 86 | |
| M: | C.I. Acid Red 35 | |
| C: | C.I. Direct Blue 199 | |
| Bk: | C.I. Food Black 2 | |

Evaluation was made regarding the four items of (1) image density, (2) indoor preservability, (3) white haze, and (4) fattening of letters.

The image density was evaluated by measuring the optical density, OD (Bk), of reflection at a solid black print portion by means of a McBeth reflectodensitometer RD-918.

The indoor preservability was evaluated by leaving the printed matters standing in an office environment where outdoor air circulates and direct sunshine is intercepted, and measuring the color difference ($\Delta E^*$) after one month and after three months by means of a color-difference meter CA-35 made by Murakami Shikisai Kenkyusho K.K.

The white haze and the fattening of letters were evaluated organoleptically in three grades of good (O), medium (Δ), and poor (X).

The results of the evaluation are shown in Table 3.

TABLE 3

| Example No. | OD (Bk) | ΔE* After 1 month | ΔE* After 3 months | White haze | Letter-fattening |
|---|---|---|---|---|---|
| 1 | 1.40 | 2 | 3 | ○ | ○ |
| 2 | 1.35 | 1 | 2 | ○ | ○ |
| 3 | 1.42 | 2 | 3 | ○ | ○ |
| 4 | 1.44 | 2 | 3 | ○ | ○ |
| 5 | 1.31 | 1 | 1 | Δ | Δ |

COMPARATIVE EXAMPLE 1

A recording medium was prepared in the same manner as in Examples 1-5 except that the only one pigment, p-Type (basic magnesium carbonate $4MgCO_3.Mg(OH)_2.4H_2O$, average particle diameter: 12.8 μm, BET specific surface area: 35 $m^2/g$) made by Ube Chemical Industries Co. Ltd., was used, and was evaluated in the same manner as in Example 6. Consequently, the recording medium was satisfactory in prevention of indoor discoloration but was unsatisfactory in white haze and letter-fattening with low image density as shown in Table 4.

COMPARATIVE EXAMPLE 2

A recording medium was prepared in the same manner as in Examples 1-5 except that the only one pigment, Tomix AD600, was used, and was evaluated in the same manner as in Example 6. Consequently, the recording medium was satisfactory in indoor discoloration, white haze and letter-fattening, but was unsatisfactory in image density as shown in Table 4.

COMPARATIVE EXAMPLE 3

A recording medium was prepared in the same manner as in Examples 3-5 except that a synthesized hydrotalcite (basic magnesium aluminum hydroxy carbonate hydrate, $Mg_{4.5}Al_2(OH)_{13}CO_3 3.5H_2O$, average particle diameter: 2.98 μm) made by Tomita Seiyaku K.K. was used in place of magnesium silicate, and was evaluated in the same manner as in Example 6. Consequently, the recording medium was less satisfactory in indoor discoloration, white haze and letter-fattening, and was unsatisfactory in image density as shown in Table 4.

TABLE 4

| Comparative example No. | OD (Bk) | ΔE* After 1 month | ΔE* After 3 months | White haze | Letter-fattening |
|---|---|---|---|---|---|
| 1 | 1.30 | 0 | 1 | X | X |
| 2 | 1.26 | 1 | 2 | ○ | ○ |
| 3 | 1.28 | 2 | 3 | Δ | Δ |

EXAMPLES 7-11

The average particle diameters of the magnesium salt of phosphorus oxy-acid used in producing the recording mediums of the present invention are shown in Table 5 below. As the basic magnesium carbonate, spherical basic magnesium carbonate A and spherical basic magnesium carbonate B having the average particle diameters and the BET specific surface areas shown in Table 5 were prepared and used (prepared according to the method disclosed in Japanese Patent Application Laid-Open No. 60-54915 with modification of reaction conditions).

TABLE 5

| Sample | Maker | Average particle diameter (μm) | BET specific surface area ($m^2/g$) |
|---|---|---|---|
| Magnesium phosphate I | | 1.19 | — |
| Coagulated one II*1 | | 5.2 | — |
| Coagulated one III*1 | | 30.1 | — |
| Spherical basic magnesium carbonate A | Self-made | 10.2 | 30 |
| Spherical basic magnesium carbonate B | Self-made | 6.7 | 40 |

*1 Magnesium phosphate, pulverized experimentally by means of a sand mill

The recording mediums were prepared by the method below.

Firstly, 15 parts of spherical basic magnesium carbonate was mixed with 85; parts of water, and the mixture was stirred for 15 minutes at 10,000 rpm by means of a commercial homogenizer.

In the same manner, 10 parts of magnesium phosphate was mixed and stirred with 90 parts of water.

The above two dispersions were mixed with a separately prepared aqueous binder solution (aqueous 10% polyvinyl alcohol solution) in a desired pigment/binder ratio (based on solid contents) and stirred for 5 minutes. Further, various necessary additives were added in a specified amount, and stirred for 5 minutes.

The coating liquid prepared as above was applied onto a base paper having a reduced sizing degree of 3 second as a basis weight of 65 $g/m^2$ in a coating solid amount of 5 $g/m^2$, The coated matter was dried at 110° C. for 5 minutes, and was subjected to a supercalender treatment to give a recording medium of the present invention.

For every recording medium, the used binder contained polyvinyl alcohols made by Kuraray Co., Ltd., PVA117 (saponification degree: 98.5 mol%, viscosity at concentration of 4% at 20° C.: 35 cps) and PVA217 (saponification degree: 89 mol%, viscosity at concentration of 4% at 20° C.: 30 cps) in a solid matter ratio of PVA117/PVA217=4/1.

As a dye fixing agent, PAS-A-120S made by Nitto Boseki Co., Ltd. (a polyamine sulfonate salt molecular weight: $10^5$) was added in an amount of 10% by weight based on the pigments. The ratio of the pigments to the binder was 2/1.

The constitutions of the pigments for the recording mediums of Examples 7-11 prepared above were summarized in Table 6.

TABLE 6

| Example | Spherical basic magnesium carbonate | | Magnesium silicate | |
|---|---|---|---|---|
| No. | Type | Parts | Type | Parts |
| 7 | A | 4 | I | 1 |
| 8 | A | 2 | I | 1 |
| 9 | B | 4 | I | 1 |
| 10 | B | 4 | II | 1 |
| 11 | B | 4 | III | 1 |

EXAMPLE 12

With the recording mediums of Examples 7-11, ink-jet recording was practiced by use of the ink having the composition below in an amount of ink of 8 nl/mm² for each single color.

| Ink composition | |
|---|---|
| Dye | 5 parts |
| Diethylene glycol | 20 parts |
| Water | 80 parts |
| Dye | |
| Y: C.I. Direct Yellow 86 | |
| M: C.I. Acid Red 35 | |
| C: C.I. Direct Blue 199 | |
| Bk: C.I. Food Black 2 | |

Evaluation was made regarding the four items of (1) image density, (2) indoor preservability, (3) white haze, and (4) fattening of letters.

The image density was evaluated by measuring the optical density, OD (Bk), of reflection at a solid black print portion by means of a McBeth reflectodensitometer RD-918.

The indoor preservability was evaluated by leaving the printed matters standing in an office environment where outdoor air circulates and direct sunshine is intercepted, and measuring the color difference ($\Delta E^*$) after one month and after three months by means of a color-difference meter CA-35 made by Murakami Shikisai Kenkyusho K.K.

The white haze and the fattening of letters were evaluated organoleptically in three grades of good (O), medium (Δ), and poor (x).

The results of the evaluation are shown in Table 7.

TABLE 3

| Example No. | OD (Bk) | ΔE* After 1 month | ΔE* After 3 months | White haze | Letter-fatten-ing |
|---|---|---|---|---|---|
| 7 | 1.38 | 3 | 4 | O | O |
| 8 | 1.32 | 2 | 3 | O | O |
| 9 | 1.41 | 1 | 2 | O | O |
| 10 | 1.43 | 2 | 3 | O | O |
| 11 | 1.35 | 2 | 3 | Δ | Δ |

As described above, the present invention provides an ink-jet recording medium which is capable of giving a recorded image of high density and is free from the problems of indoor discoloration, white haze, fattening of letters, and so on, as well as an ink-jet recording method using the same.

What is claimed is:

1. An ink-jet recording medium comprising a layer containing basic magnesium carbonate and a magnesium salt of silicic acid formed on a support.

2. The ink-jet recording medium of claim 1, wherein the basic magnesium carbonate is spherical basic magnesium carbonate.

3. The ink-jet recording medium of claim 1, wherein the magnesium salt of silicic acid has an average particle diameter of not more than 7 μm.

4. The ink-jet recording medium of claim 1, wherein the magnesium salt of silicic acid is magnesium silicate.

5. The ink-jet recording medium of claim 1, wherein the ratio by weight of the basic magnesium carbonate to the magnesium salt of silicic acid is in the range of from 1/5 to 9/1.

6. The ink-jet recording medium of claim 1, wherein the basic magnesium carbonate and the magnesium salt of silicic acid is applied on the support in an amount of from 0.2 to 50 g/m² based on solid.

7. An ink-jet recording method conducted by applying droplets of aqueous ink onto a recording medium, the recording medium comprising a layer containing basic magnesium carbonate and a magnesium salt of silicic acid formed on a support.

8. The ink-jet recording method of claim 7, wherein the basic magnesium carbonate is spherical basic magnesium carbonate.

9. The ink-jet recording method of claim 7, wherein the magnesium salt of silicic acid has an average particle diameter of not more than 7 μm.

10. The ink-jet recording method of claim 7, wherein the magnesium salt of silicic acid is magnesium silicate.

11. The ink-jet recording method of claim 7, wherein the ratio by weight of the basic magnesium carbonate to the magnesium salt of silicic acid is in the range of from 1/5 to 9/1.

12. The ink-jet recording method of claim 7, wherein the basic magnesium carbonate and the magnesium salt of silicic acid is applied on the support in an amount of from 0.2 to 50 g/m² based on solid.

13. The ink-jet recording method of claim 7, wherein a plurality of different color of inks are employed.

* * * * *

UNITED STATES PATENT AND TRADEMARK OFFICE
CERTIFICATE OF CORRECTION

PATENT NO. : 5,137,778 Page 1 of 3
DATED : August 11, 1992
INVENTOR(S) : Nakatsugawa et al.

It is certified that error appears in the above-identified patent and that said Letters Patent is hereby corrected as shown below:

[56] References Cited:

U.S. PATENT DOCUMENTS

"4,460,637 3/1992 Miyamoto et al." should read --4,460,637 7/1984 Miyamoto et al.--.

COLUMN 2:

Line 23, "a" should read --an--; and
Line 58, "medium the" should read --medium, the--.

COLUMN 3:

Line 46, "sphere" should read --spherical--; and
Line 47, "minor axis 37b" should read --minor axis "b"--.

COLUMN 4:

Line 50, "coater," should read --coater--.

COLUMN 5:

Line 3, "having" should read --having the--.

CERTIFICATE OF CORRECTION

PATENT NO. : 5,137,778

DATED : August 11, 1992

INVENTOR(S) : Nakatsugawa et al.

It is certified that error appears in the above-identified patent and that said Letters Patent is hereby corrected as shown below:

COLUMN 6:

Line 17, "second" should read --seconds--; and
Line 18, "5 $g/m^2$," should read --5 $g/m^2$.--.

COLUMN 7:

Line 54, "$Mg_{4.5}AL_2(OH)_{13}CO_33.5H_2O$" should read --$Mg_{4.5}AL_2(OH)_{13}CO_3 \cdot 3.5H_2O$--.

COLUMN 8:

Line 42, "85; parts" should read --85 parts--;
Line 55, "second" should read --seconds--;
Line 56, "5 $g/m^2$," should read --5 $g/m^2$.--; and
Line 68, "salt molecular" should read --salt, molecular--.

COLUMN 9:

Line 6, "were" should read --are--.

UNITED STATES PATENT AND TRADEMARK OFFICE

CERTIFICATE OF CORRECTION

PATENT NO. : 5,137,778 Page 3 of 3

DATED : August 11, 1992

INVENTOR(S) : Nakatsugawa et al.

It is certified that error appears in the above-identified patent and that said Letters Patent is hereby corrected as shown below:

COLUMN 10:

TABLE 3, "TABLE 3" should read --TABLE 7--; and

" White haze Letter-fatten-ing" should read

--White haze Letter-fatten-ing--

Line 59, "color" should read --colors--.

Signed and Sealed this

Nineteenth Day of October, 1993

Attest:

Bruce Lehman

BRUCE LEHMAN

*Attesting Officer* *Commissioner of Patents and Trademarks*